April 23, 1963     H. GOLD     3,086,365

HYDRAULIC FLOW CONTROL SYSTEM

Filed March 28, 1961

INVENTOR.
Harold Gold

BY

United States Patent Office 3,086,365
Patented Apr. 23, 1963

3,086,365
HYDRAULIC FLOW CONTROL SYSTEM
Harold Gold, 3645 Tolland Road, Shaker Heights, Ohio
Filed Mar. 28, 1961, Ser. No. 98,897
19 Claims. (Cl. 60—52)

This invention relates to a throttling-type hydraulic flow control system in which the rate of flow to a hydraulic actuator is bidirectionally controlled in response to the rate and direction of flow through a positive displacement control pump and in which the pressure gradient across the control pump is automatically maintained at zero.

Devices that employ the principles of my invention may be used in hydraulic circuits to control the rate of travel of a piston in a cylinder or the rate of shaft rotation of a fluid motor or the like in either direction. The basic input signal to which the system responds is the rate and direction of displacement of a control pump. Because the pressure gradient across the control pump is automatically held at zero, the power required to generate the input signal is only that attributable to mechanical and viscous friction.

An important object of my invention is to provide a means for controlling the rate and direction of motion of a hydraulic actuator so that the rate is maintained at a desired value under changing actuator load conditions, without modification of the input signal.

Another object of my invention is to provide a means for controlling the action of a three or four-way valve so that within the flow capacity of the valve, the valve flow rate is independent of the pressure gradient across the valve ports.

It is still another object of my invention to provide a means for controlling the action of a three or four-way valve so that the flow rate through the valve ports is made proportional to a mechanical rate input.

Figure 1:
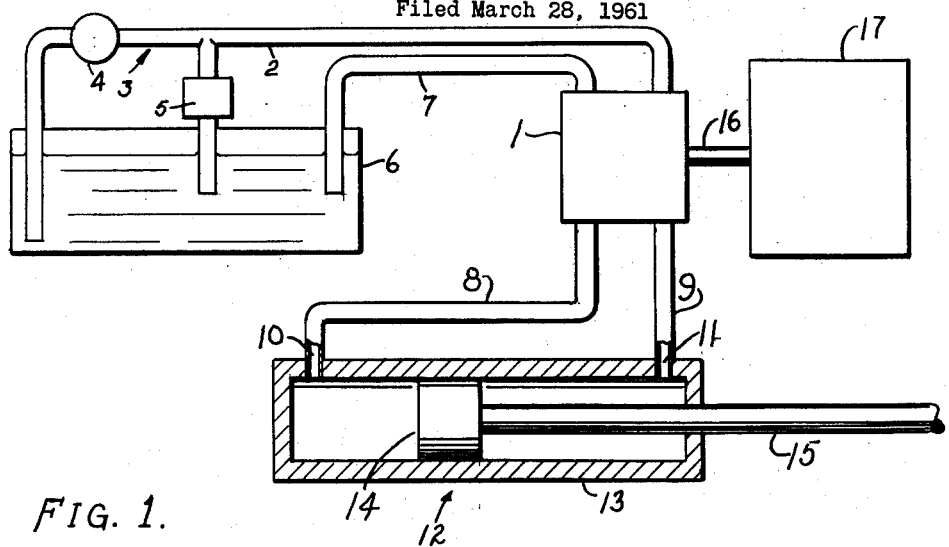
Figure 2:
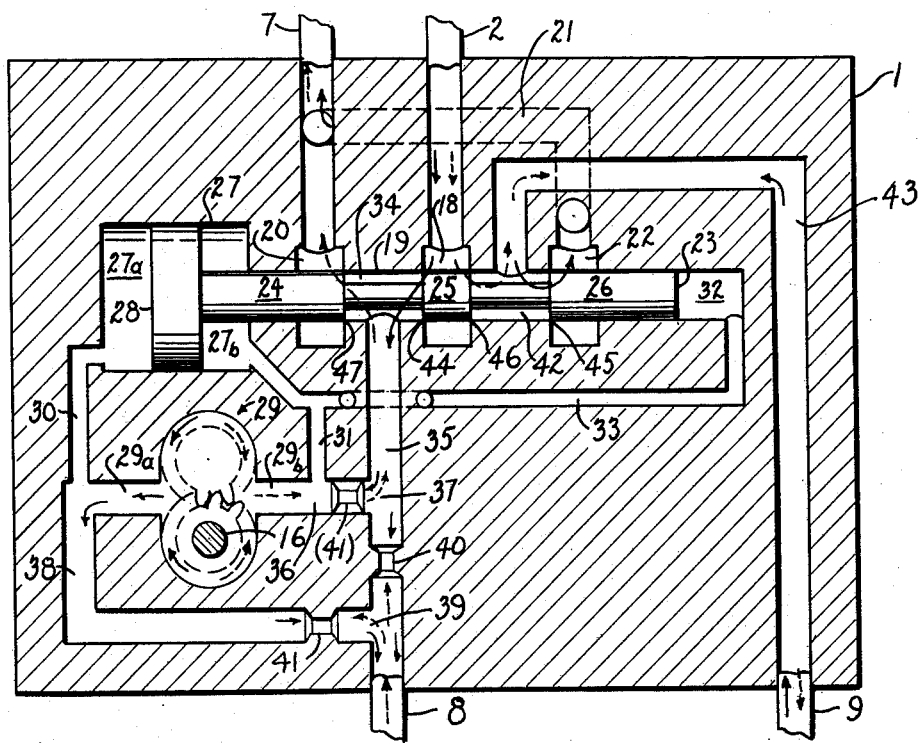

Other important objects, features and advantages will be more fully apparent from the following detailed description taken in conjunction with the following accompanying drawings in which:

FIGURE 1 is a diagrammatic illustration showing an external view of my invention and the manner of its installation in a hydraulic circuit; and FIGURE 2 is a diagrammatic cross-sectional view illustrating the flow control mechanism of my invention.

In the description, and with reference to the drawings, the structure and operation of the control system will be divided under headings for ease of explanation in accordance with the operation of the system in either direction of flow and in accordance with the certain properties of the system.

*Installation and Basic Circuit*

As shown in the drawings, the control housing 1 has typically four circuit connection points. As will be explained as this description proceeds the control housing embodying my invention can utilize a minimum of three circuit connections or more than four, as the particular use demands. However, the principle of my invention can best be described with reference to four circuit connections.

Referring to FIGURE 1, pressurization line 2 connects to the system pressure supply 3 which in this instance is represented by a motor driven pump 4 and a pressure relief valve 5. The system is supplied with a liquid, such as a hydraulic fluid, from tank 6. Return line 7 carries liquid back to tank 6 from control housing 1. As will be explained as the description proceeds, it is not a requirement for the system of my invention that the pressure in line 2 or line 7 be maintained at steady values. For this reason a wide variety of pressure supply devices may be used in place of the pressure supply device shown.

Outlet lines 8 and 9 connect to ports 10 and 11 respectively of actuator 12. Actuator 12 consists of a cylinder 13, piston 14 and rod 15. Any form of displacement type actuator, linear or rotary can be substituted for actuator 12. However, the principle of my invention can be fully described with reference to actuator 12.

Rotary input shaft 16 projects from housing 1 through a suitable liquid seal and couples to motor 17. The speed and direction of rotation of motor 17 is controlled by an external controller (not shown). Motor 17 may be of any type or form. It is necessary only that means be provided for rotating shaft 16 at variable rates of rotation in either direction. As will be explained as the description proceeds, the hydraulically generated torque on shaft 16 is zero and therefore the power required to maintain a given rate of rotation of shaft 16 is, in practice, very small. For this reason manual power can be used in place of a motor. When manual power is to be used a hand-wheel may be coupled to shaft 16 in place of motor 17.

Referring to the diagrammatic cross-sectional view of housing 1 in FIGURE 2, pressurization line 2 connects to annulus 18 in cylindrical bore 19 and return line 7 connects directly to annulus 20 in bore 19 and through passage 21 connects to annulus 22 in bore 19. Spool 23 mates with and slides freely in bore 19 and has lands 24, 25, and 26 which cover annuluses 20, 18 and 22 respectively. Land 24 projects into cylindrical chamber 27. Piston 28 mates with and slides freely in chamber 27 and is rigidly coupled to spool 23. Piston 28 divides chamber 27 into chambers 27a and 27b. Chamber 27a communicates with side 29a of positive displacement pump 29 through passage 30. Chamber 27b communicates with side 29b of pump 29 through passage 31 and with the end of spool 23 at chamber 32 through passage 33. Chamber 34 formed between lands 24 and 25 of spool 23 communicates with outlet line 8 through passage 35. Passage 36 branches off from passage 35 at juncture 37 and leads to side 29b of pump 29. Side 29a connects to passage 38 which in turn connects to passage 35 at juncture 39. Orifice 40 is located in passage 35 between junctures 37 and 39. Orifice 41 is located in passage 38. An alternate location for orifice 41 is in passage 36 between the juncture 37 and the juncture with passage 31. Chamber 42 formed between lands 25 and 26 of spool 23 communicates with outlet passage 9 through passage 43.

Rotary input shaft is keyed to one gear of pump 29 for effecting rotation of the gears. Pump 29 is here illustrated to be a gear pump, but this type of pump is chosen purely for clarity of illustration. Any type of positive displacement pump may be employed without departing from the principle of my invention.

In the illustration of FIGURE 2 spool 23 is drawn in the neutral or no-flow position. In this position the variable orifices formed by the juncture of the spool lands and the bore annuluses are all at zero open area. As will be explained as the description proceeds, the spool 23 moves to the no-flow position when shaft 16 is stationary.

Operation in One Direction

When shaft 16 and the gears of pump 29 are rotated in the direction indicated by the solid arrows, liquid is drawn from chambers 27b and 32 and is fed into chamber 27a. This transfer of liquid forces piston 28 to move to the right in FIGURE 2. The motion of spool 23 to the right causes variable orifices 44 and 45 to open while variable orifices 46 and 47 remain closed. Chamber 34 then communicates with the pressure source at annulus 18 and chamber 42 communicates with the return line 7 through annulus 22. With the spool so displaced from neutral, flow is established in the circuit as indicated by the solid arrows. Assuming that the shaft 16 is rotating at a constant rotational rate in the direction indicated by the solid arrows, spool 23 moves to the right and reaches an equilibrium position as described in the following paragraph.

Because spool 23 and piston 28 are free to move in their respective bores the spool can come to rest only when the pressure in chamber 27a is equal to the pressure in chamber 27b and chamber 32. By virtue of the passages described the pressures at sides 29a and 29b are also equal when the spool 23 comes to rest at an equilibrium position. With the pressure gradient across pump 29 equal to zero the flow rate through the pump is unaffected by leakage through pump clearance and is exactly equal to the rate of displacement of the pump. The flow rate into actuator port 10 must be the sum of the flow rate established by pump 29 and the flow rate through bypass orifice 40. If the pump orifice 41 is located in passage 38 the pressure downstream of orifice 41 is equal to the pressure downstream of orifice 40 by virtue of juncture 39. The pressure upstream of orifice 41 is equal to the pressure upstream of orifice 40 by virtue of the juncture 37 and the zero pressure gradient across pump 29. By virtue of this pressure equality the pressure gradient across orifice 40 is equal to the pressure gradient established across orifice 41. The flow rate through orifice 40 is thereby made proportional to the flow rate through orifice 41. The flow rate through orifice 41 is equal to the rate of displacement of pump 29. Therefore, the flow rate into port 8 is proportional to but larger than the rate of displacement of pump 29.

If pump orifice 41 is located in the alternate position in passage 36 the pressure upstream of orifice 41 is equal to the pressure upstream of orifice 40 by virtue of juncture 37. The pressure downstream of orifice 41 is made equal to the pressure downstream of orifice 40 by virtue of the zero pressure gradient across pump 29 and the juncture 39. By virtue of this pressure equality the pressure gradient across orifice 40 is equal to the pressure gradient across orifice 41. Therefore, location of orifice 41 in either of the two locations described yields precisely the same results.

The flow of liquid into actuator port 10 causes piston 14 to displace toward port 11. Piston 14 thereby displaces liquid in cylinder B which passes out through port 11. The liquid that flows out of port 11 passes through passage 9 and passage 43 into chamber 42. As previously described, chamber 42 is now in communication with return line 7 and the liquid passes through variable orifice 45, into chamber 22, through passage 21 and into return passage 7.

Operation in the Opposite Direction

When shaft 16 and the gears of pump 29 are rotated in the direction indicated by the dashed arrows liquid is drawn from chamber 27a and is fed into chambers 27b and 32. This action transfers piston 28 and spool 23 to the left in FIGURE 2. The motion of spool 23 to the left causes variable orifices 46 and 47 to open while orifices 44 and 45 close and remain closed. Chamber 42 then communicates with the pressure source at annulus 18 and chamber 34 communicates with the return line 7 through annulus 20. With the spool so displaced from neutral flow is established in the circuit as indicated by the dashed arrows. Assuming that the shaft 16 is now rotating at a constant angular speed in the direction indicated by the dashed arrows the spool 23 moves to the left and reaches an equilibrium position as described in the following paragraph.

Spool 23 comes to rest when the pressure in chamber 27a is equal to the pressure in chambers 27b and 32, and hence when the pressure gradient across pump 29 is zero. Pressure in chamber 42 causes liquid to flow into actuator port 11, causing piston 14 to move toward port 10. This motion of piston 14 pumps liquid out of cylinder 13 through port 10 and passage 8 and into passages 35 and 38. If pump orifice 41 is located in passage 38 the pressure upstream of orifice 41 is equal to the pressure upstream of orifice 40 by virtue of juncture 39. The pressure downstream of orifice 41 is equal to the pressure downstream of orifice 40 by virtue of juncture 37 and the zero pressure gradient across pump 29. By virtue of the pressure equality the pressure gradient across orifice 40 is equal to the pressure gradient across orifice 41. The flow rate through orifice 40 is thereby made proportional to the flow rate through orifice 41 and is hence proportional to the rate of displacement of pump 29. If pump orifice 41 is located in the alternate position in passage 36, the pressure downstream of orifice 41 is made equal to the pressure downstream of orifice 40 by virtue of juncture 37. The pressure upstream of orifice 41 is made equal to the pressure upstream of orifice 40 by virtue of juncture 39 and the zero pressure gradient across pump 29. The flow rate through orifice 41 is thereby made proportional to the flow rate through orifice 41 and hence is proportional to the rate of displacement of pump 29. As in the case of flow in the first mentioned direction, the location of orifice in either of the two locations described yields precisely the same results.

As now described the direction of flow through actuator port 10 is dependent upon the direction of rotation of shaft 16 and the rate of flow is proportional to the rate of rotation of shaft 16.

Compensation for Load Force Variations and Imperfect Valve Construction

If pump 29 is stationary or is rotating in either direction spool 23 automatically finds a position in sleeve 19 such that the pressure gradient across pump 29 is zero. As previously described the flow rate into or out of actuator port 10 is then proportional to the rate of displacement of pump 29. Any deviation from the fixed proportionality of the flow rate through actuator port 10 to the rate of displacement of pump 29 causes a pressure gradient to appear across pump 29. This pressure gradient causes spool 23 to move axially in bore 19 thereby adjusting variable orifices 44, 45, 46, and 47 until the pressure gradient is restored to zero. In this manner variations in load force acting on actuator rod 15 are automatically compensated for by movement of spool 23. As long as the zero pressure gradient is maintained across pump 29 variations in load force do not reflect in torque variations in shaft 16.

The constant proportionality of flow rate through port 10 to the rate of displacement of pump 29 is not disturbed by imperfections in valve construction so long as there exists a position of spool 23 in bore 19 that can satisfy the pressure and flow conditions to continuously establish the zero pressure gradient across pump 29.

Elimination of Control Pump Bypass

As previously described the flow rate through orifice 40 is proportional to the flow rate through orifice 41. Because of the condition of equal pressure gradients the proportionality is determined by the ratio of the effective areas of the two orifices. This proportionality may be expressed as follows $$Q_{40} = \frac{A_{40}}{A_{41}} Q_{41}$$

where $Q_{40}$=flow rate through orifice 40
$Q_{41}$=flow rate through orifice 41
$A_{40}$=effective flow area of orifice 40
$A_{41}$=effective flow area of orifice 41

The flow rate through port 10 ($Q_{10}$) is the sum of the two orifice flow rates, thus $$Q_{10} = Q_{40} + Q_{41}$$

The flow rate $Q_{41}$ is equal to the rate of displacement of pump 29, thus $$Q_{41} = DN$$

where $D$=displacement per revolution of pump 29
$N$=revolutions per unit time of shaft 16

By combining the three equations I obtain the equation of flow rate through port 10, $$Q_{10} = \left[\frac{A_{40}}{A_{41}} + 1\right] DN$$

As may be seen from the last equation, the ratio of the effective area of orifice 40 to the effective area of orifice 41 should be made large when it is desired to control large flow rates with small rates of displacement of pump 29. If however, there is no requirement for magnifying the rate of displacement of pump 29 the area of orifice 40 can be reduced to zero, in which case the last equation reduces to $$Q_{10} = DN$$

By reducing the area of orifice 40 to zero the bypass around pump 29 is eliminated. The action of the control pump 29 in controlling the flow rate through port 10 remains exactly the same as previously described.

*Single-Ended Operation*

As previously described, variable orifices 45 and 46 provide the means for the modulation of flow rate through port 11 of actuator 12. This flow modulation means is of importance for the provision of pressure to drive piston 14 toward port 10. However, the rate of travel of piston 14 toward port 10 is controlled by pump 29 and variable orifice 47 just as the rate of travel of piston 14 away from port 10 is controlled by pump 29 and variable orifice 44. For this reason factors such as unequal port flow rates caused by a single rod 14 in actuator 12, do not alter the operation of my system.

In some uses of hydraulic actuators, liquid is fed only to one actuator port, the load providing the driving force for the return stroke of the piston. This arrangement is known in the art as single-ended operation. The system of my invention can be applied to single-ended operation by disconnecting the communication with port 11 and blocking passage 43. In a more direct manner the system can be applied to single-ended operation through the elimination of annulus 22 in bore 19, elimination of chamber 42 in spool 23 and elimination of passage 43. Chamber 32 is retained because it is essential in the case of single-ended and double-ended operation that the axial force on spool 23 and piston 28 be zero when the pressure gradient across pump 29 is zero.

*Elimination of the Auxiliary Piston*

Auxiliary piston 28 operating in cylinder 27 provides a means for amplifying the axial force on spool 23 that results from a deviation from zero of the pressure gradient across pump 29. Piston 28 serves to reduce the pressure gradients that result from extraneous forces that may act on spool 23. If piston 28 is eliminated and the pressure from side 29a of pump 29 is allowed to act directly on the end of spool 23, the system of my invention still functions as previously described, but the accuracy with which the zero pressure gradient across pump 29 is maintained is reduced. Small pressure gradients across pump 29 create small torques on shaft 16, small leakage flows passed pump 29 and small departures from the fixed proportionality of the flow rates through orifices 40 and 41. In many practical applications of the system of my invention these deviations from ideal performance can be tolerated. In such cases piston 28 may be eliminated.

*Control Pump and Drive Combinations*

As previously described, the requirement placed on the control pump 29 and the motor means 17 is that the combination be operable to produce variable rates of displacement in either direction. This requirement can be met with either of two principal combinations: a fixed displacement pump driven by a variable speed, reversible motor; or a variable displacement, reversible pump driven by a fixed or variable speed motor. In the case of the second combination it would be unnecessary and redundant to employ a reversible motor. In the case of the first combination the motor may comprise either a variable speed, reversible motor or a fixed speed, nonreversible motor in combination with a variable speed, reversible transmission. The choice of a motor for a particular application of my flow control system involves factors the discussion of which is beyond the proper scope of this description. However, it is noteworthy that it may often be advantageous to employ a fluid motor that obtains its energy from the system pressure supply.

I claim:

1. A mechanism for positioning a spool valve, said spool valve comprising a spool operating freely in a bore, lands on said spool, openings in said bore, said lands and said openings defining an inlet port, a return port and a plurality of outlet ports, said mechanism comprising a positive displacement pump in series relation with one of said outlet ports, a bypass conduit around said pump, a fixed orifice in said bypass conduit, a second fixed orifice in series relation with said pump, conduit and chamber means communicating the pressure at one side of said pump to an end of said spool and communicating the pressure at the opposite side of said pump to the opposite end of said spool, said spool valve being thereby operable to equalize the pressures on the opposite sides of said pump and to equalize the pressure gradients across said orifices, and means adjusting the rate and direction of displacement of said pump.

2. In the mechanism of claim 1, auxiliary piston means axially and rigidly linked to said spool, said auxiliary piston means being of greater effective area than the ends of said spool, opposite sides of said spool communicating with said auxiliary piston means and with the ends of said spool.

3. A mechanism for regulating the volumetric rate of flow of liquid alternately from a pressure source to a displacement type hydraulic actuator or from said actuator to a drain comprising a positive displacement pump means, a valve means, and a pressure responsive means operable to actuate said valve means, said valve means comprising a pair of varible orifices and a chamber therebetween, said orifices being alternately variable from zero open area to alternately communicate said chamber with the pressure source or with the drain, one side of said pump being in communication with said chamber, the opposite side of said pump being in communication with a port of said actuator, said pressure responsive means being in simultaneous communication with opposite sides of said pump and operable to vary said orifices to communicate said chamber with the pressure source when the pressure at the actuator side of said pump is greater than the pressure at the chamber side of said pump, or to communicate said chamber with the drain when the pressure at the said actuator side is less than the pressure at the said chamber side, whereby the pressures on opposite sides of said pump are automatically equalized and the volumetric rate of flow of liquid to or from the actuator is made equal to the rate and direction of displacement of said pump.

4. A combination with the mechanism of claim 3, a second valve means, said pressure responsive means being operable to actuate said second valve means simultaneously with said first valve means, said second valve means comprising a second pair of variable orifices and a chamber therebetween, said second orifices being at zero open area while said first orifices are at zero open area and said second orifices being alternately variable from zero open area to alternately communicate said second chamber with the pressure source while said first chamber is in communication with the drain or with the drain while said first chamber is in communication with the pressure source, said second chamber being in direct communication with a second port of said actuator whereby the actuator is bidirectionally driven.

5. In the mechanism of claim 3, a bypass conduit around said pump, a fixed orifice in said conduit, a second fixed orifice in series relation with said pump, the action of said valve means to equalize the pressures on opposite sides of said pump thereby equalizing the pressure gradients across said fixed orifices, whereby the rate of flow through said first fixed orifice is proportional to the rate of displacement of said pump and whereby the volumetric rate of flow to or from the actuator is made proportional to but greater than the rate of displacement of said pump.

6. A mechanism for regulating the volumetric rate of flow of a liquid alternately from a pressure source to a displacement type hydraulic actuator or from said actuator to a drain comprising a positive displacement pump means, pump bypass means, fixed orifice means, a valve means, and a pressure responsive means to actuate said valve means, said pump bypass means comprising a bypass conduit around said pump, said orifice means comprising a fixed orifice in said bypass conduit and a second fixed orifice in series relation with said pump, said valve means comprising a pair of variable orifices and a chamber therebetween, said variable orifices being alternately variable from zero open area to alternately communicate said chamber with the pressure source or with the drain, one side of said pump being in communication with said chamber and the opposite side of said pump being in communication with a port of said actuator, said pressure responsive means being in simultaneous communication with the opposite sides of said pump and operable to vary said variable orifices to communicate said chamber with the pressure source when the pressure at the actuator port side of said pump is greater than the pressure at the chamber side of said pump or to communicate said chamber with the drain when the pressure at the actuator port side of said pump is less than the pressure at the chamber side of said pump, whereby pressures on the opposite sides of said pump and the pressure gradients across said fixed orifices are each equalized automatically, whereby the rate of flow through said bypass is proportional to the rate of displacement of said pump and whereby the volumetric rate of flow to or from the actuator is proportional to but greater than the rate of displacement of said pump.

7. A combination with the mechanism of claim 6, a second valve means, said pressure responsive means being operable to actuate said second valve means simultaneously with said first valve means, said second valve means comprising a second pair of variable orifices and a chamber therebetween, said second orifices being at zero open area while said first orifices are at zero open area and said second orifices being alternately variable from zero open area to alternately communicate said second chamber with the pressure source while said first chamber is in communication with the drain or with the drain while said first chamber is in communication with the pressure source, said second chamber being in direct communication with a second port of said actuator, whereby the actuator is bidirectionally driven.

8. A mechanism for positioning a spool valve, said spool valve comprising a spool operating freely in a bore, lands on said spool, openings in said bore, said lands and said openings defining an inlet port, a return port and a plurality of outlet ports, said inlet port communicating with a pressure source, said return port communicating with a drain and said outlet ports communicating with a hydraulic circuit, whereby the flow through said hydraulic circuit is under the control of said spool valve, said mechanism comprising a piston operating freely in a second bore, and a positive displacement pump in series relation with one of said outlet ports and located between said one outlet port and said hydraulic circuit, said second bore being of larger diameter than and concentric with said first bore, said spool projecting into said second bore and coupled to said piston, conduit and chamber means communicating the pressure at one side of said pump to an end of said spool and to the corresponding side of said piston, and communicating the pressure on the opposite side of said pump to the opposite side of said piston, the pressure forces acting on said spool being thereby magnified, said spool being thereby operable to accurately equalize the pressures on the opposite sides of said pump, and means adjusting the rate and direction of displacement of said pump.

9. In the mechanism of claim 8 said last means comprising a fixed displacement pump and a variable speed, reversible electric motor for driving said pump.

10. In the mechanism of claim 8 said last means comprising a fixed displacement pump and a variable speed, reversible fluid motor for driving said pump.

11. In the mechanism of claim 8 said last means comprising a fixed displacement pump and a variable speed, reversible, fluid motor for driving said pump, said fluid motor being energized by communication with said pressure source and with said drain.

12. In the mechanism of claim 8 said last means comprising a fixed displacement pump and a handwheel for driving said pump.

13. In the mechanism of claim 8, said positive displacement pump being reversible and variable with respect to displacement at fixed rate of rotation.

14. A mechanism for positioning a spool valve, said spool valve comprising a spool operating freely in a bore, lands on said spool, openings in said bore, said openings defining an inlet port, a return port and a plurality of outlet ports, said inlet port communicating with a pressure source, said return port communicating with a drain and said outlet ports communicating with a hydraulic circuit, whereby the flow through said hydraulic circuit is under the control of said spool valve, said mechanism comprising a positive displacement pump in series relation with one of said outlet ports and located between said one outlet port and said hydraulic circuit, conduit and chamber means communicating the pressure at one side of said pump to an end of said spool and communicating the opposite side of said pump to the opposite end of said spool, said spool valve being operable to equalize the pressures on the opposite sides of said pump, and means adjusting the rate and direction of displacement of said pump.

15. In the mechanism of claim 14, said last means comprising a fixed displacement pump and a variable speed, reversible electric motor for driving said pump.

16. In the mechanism of claim 14, said last means comprising a fixed displacement pump and a variable speed, reversible fluid motor for driving said pump.

17. In the mechanism of claim 14, said last means comprising a fixed displacement pump and a variable speed, reversible, fluid motor for driving said pump, said fluid motor being energized by communication with said pressure source and with said drain.

18. In the mechanism of claim 14, said last means comprising a fixed displacement pump and a hand wheel for driving said pump.

19. In the mechanism of claim 14, said positive displacement pump being reversible and variable with respect to displacement at fixed rate of rotation.

References Cited in the file of this patent

UNITED STATES PATENTS

| | | |
|---|---|---|
| 2,020,951 | Lemon | Nov. 12, 1935 |
| 2,836,960 | Wittren | June 3, 1958 |
| 2,916,879 | Gondek | Dec. 15, 1959 |
| 2,974,491 | Cassaday et al. | Mar. 14, 1961 |
| 2,995,012 | Cassaday et al. | Aug. 8, 1961 |
| 3,016,708 | Gordon et al. | Jan. 16, 1962 |

FOREIGN PATENTS

| | | |
|---|---|---|
| 238,020 | Switzerland | Sept. 17, 1945 |